No. 12,202. REISSUED MAR. 8, 1904.

H. E. RATHBUN & W. H. LONERGAN.

SASH BALANCE.

APPLICATION FILED DEC. 4, 1903.

2 SHEETS—SHEET 1.

Witnesses:
Ira L. Fish
Katharine A. Dugan

Inventors:
H. E. Rathbun
W. H. Lonergan
by Geo. N. Goddard
Attorney.

THE NORRIS PETERS CO., PHOTO-LITHO., WASHINGTON, D. C.

No. 12,202. REISSUED MAR. 8, 1904.

H. E. RATHBUN & W. H. LONERGAN.

SASH BALANCE.

APPLICATION FILED DEC. 4, 1903.

2 SHEETS—SHEET 2.

Witnesses:
Ira L. Fish
Katharine A. Dugan

Inventors.
H. E. Rathbun
by W. H. Lonergan
Geo. N. Goddard
Attorney.

THE NORRIS PETERS CO., PHOTO-LITHO., WASHINGTON, D. C.

No. 12,202. Reissued March 8, 1904.

UNITED STATES PATENT OFFICE.

HENRY E. RATHBUN AND WILLIAM H. LONERGAN, OF PROVIDENCE, RHODE ISLAND, ASSIGNORS, BY MESNE ASSIGNMENTS, TO THE LOXIT COMPANY, OF PROVIDENCE, RHODE ISLAND, A CORPORATION OF RHODE ISLAND.

SASH-BALANCE.

SPECIFICATION forming part of Reissued Letters Patent No. 12,202, dated March 8, 1904.

Original No. 737,867, dated September 1, 1903. Application for reissue filed December 4, 1903. Serial No. 183,842.

*To all whom it may concern:*

Be it known that we, HENRY E. RATHBUN and WILLIAM H. LONERGAN, citizens of the United States, residing at Providence, in the county of Providence and State of Rhode Island, have invented a new and useful Improvement in Sash-Balances, of which the following is a specification.

This invention relates to improvements in spring sash-balances adapted for use on window and other sashes mounted to slide in suitable frames.

One object of the invention is to so construct a sash-balance of this nature that its parts may be manufactured from sheet metal.

Another object of the invention is to so construct a sash-balance that the sash-gear may be movably mounted with relation to its casing.

Another object of the invention is to improve the locking means whereby the gear is locked from rotation.

Other objects of the invention will appear from the following description of the construction and operation of the device.

The invention consists in the peculiar construction of the sheet-metal gear and its casing.

The invention also consists in the manner of mounting the gear.

The invention also consists in the peculiar construction of the gear-locking means and in the manner of mounting the same.

The invention also consists in such other novel features of construction and combination of parts as shall hereinafter be more fully described, and pointed out in the claims.

Figure 1:
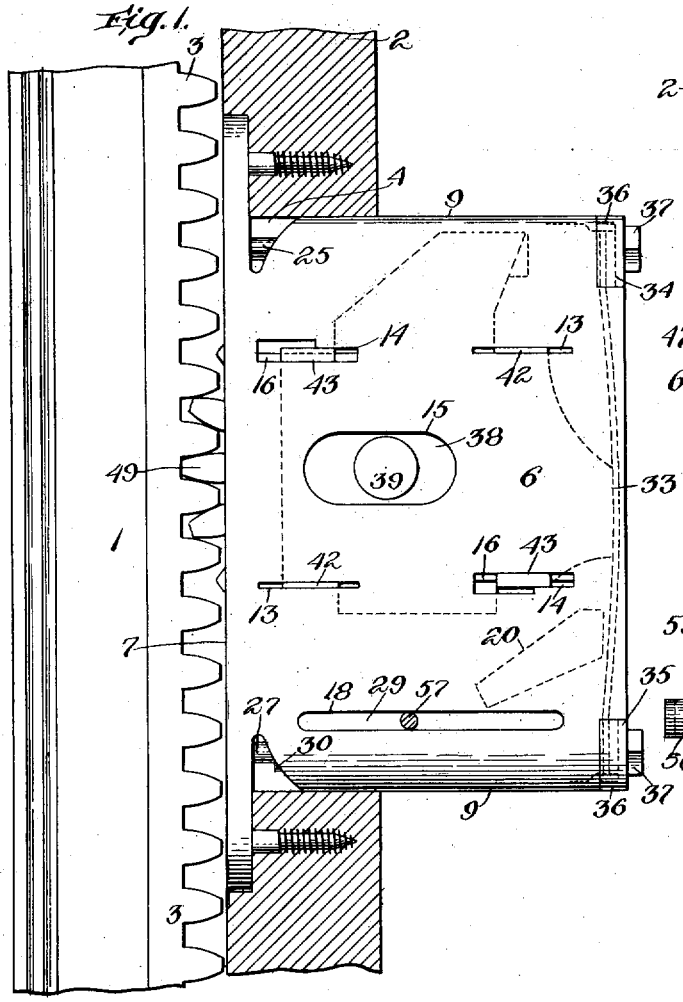
Figure 2:
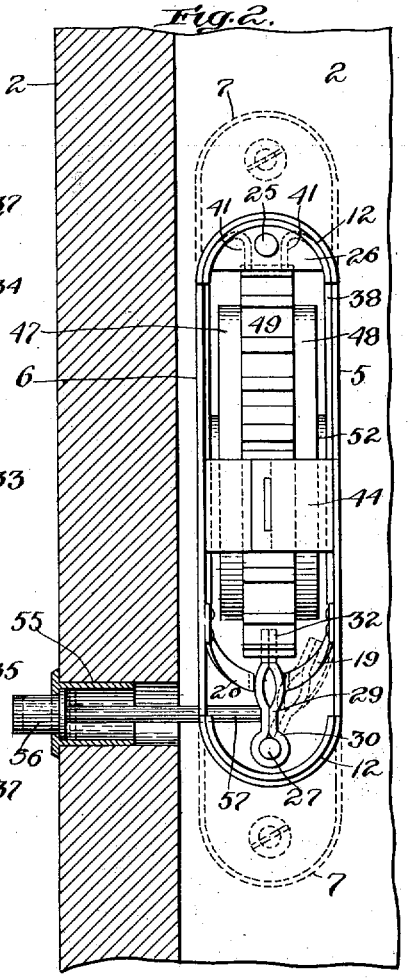
Figure 3:
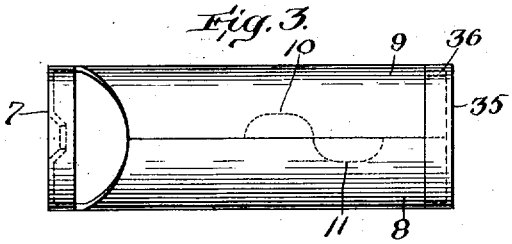
Figure 4:
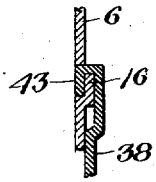
Figure 5:
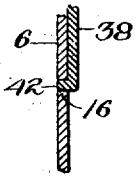
Figure 6:
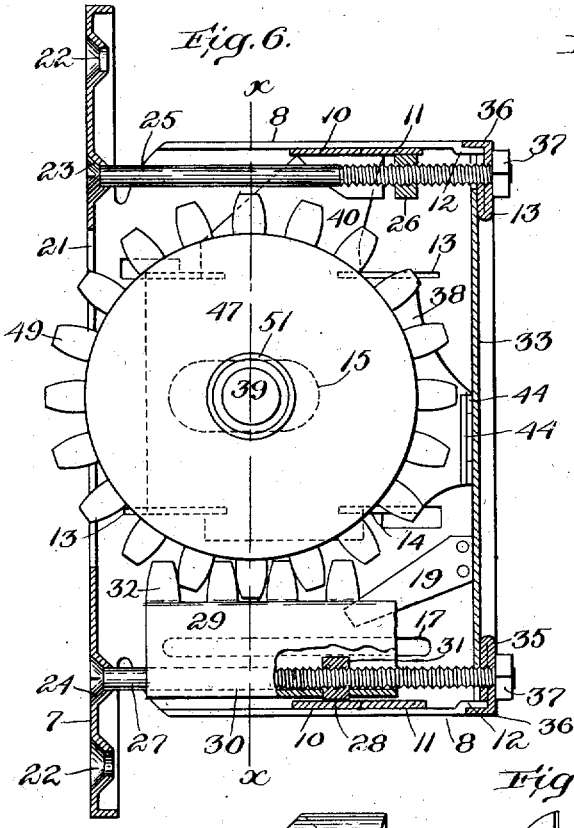
Figure 7:
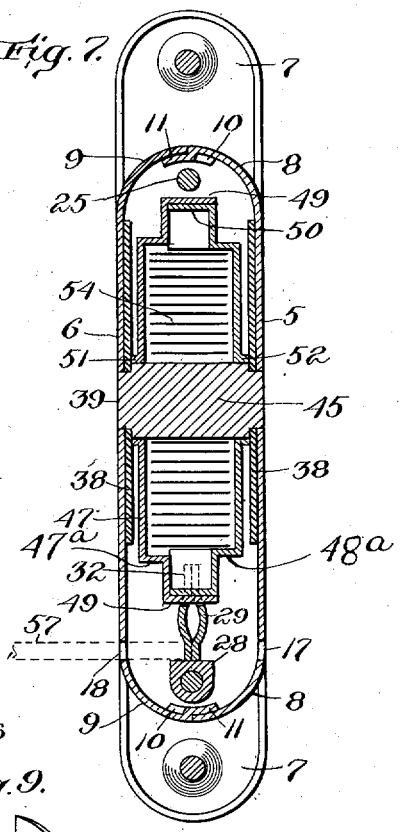
Figure 8:
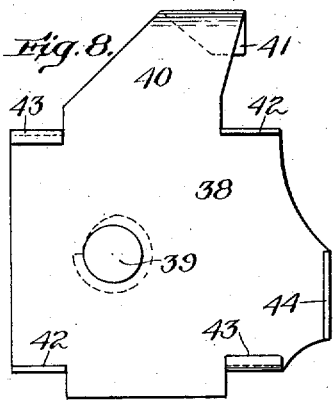
Figure 9:
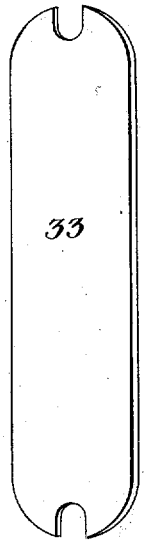
Figure 10:
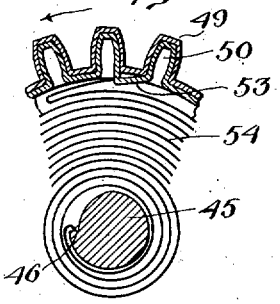

Figure 1 represents a view of portions of the sash and of the window-frame in section with the improved sash-balance secured thereto and disclosing the general construction of the sash-balance. Fig. 2 represents a sectional view of portions of the window-frame, showing a rear or inner end view of the improved sash-balance, parts of the same being removed. Fig. 3 represents an end view of the casing, the overlapping locking-lips being indicated in dotted lines. Fig. 4 represents a vertical sectional view showing details in the construction of the casing and the gear-frame. Fig. 5 represents a vertical sectional view of a part of the casing, the gear-frame, and the outwardly-bent lip on the gear-frame. Fig. 6 represents a vertical sectional view of the casing, showing the relation of the parts. Fig. 7 represents a vertical cross-sectional view taken on line X X of Fig. 6. Fig. 8 represents a plan view of one of the side plates forming part of the gear-frame. Fig. 9 represents a plan view of the rear or gear frame spring; and Fig. 10 represents a sectional view of parts of the gear, showing the sheet-metal construction of the teeth and illustrating the manner in which the gear-spring is engaged with this gear and with the shaft on which the gear works.

Similar numbers of reference designate corresponding parts throughout.

In carrying this invention into practice our main objects have been to produce an economical sash-balance by so constructing various parts that they might be struck from sheet metal, to so mount the gear that it may be moved inward under certain conditions and may automatically return to its normal position, and to provide novel locking means for the gear.

In the drawings, 1 represents a portion of any suitable sash which is adapted to slide in the frame 2. On this sash 1 is secured the rack 3, designed to be engaged by the teeth of a gear rotatably mounted on the frame 2, such frame being furnished with a socket or opening 4 to receive portions of the balance mechanism, so that its face-plate may be flush with the surface of such frame.

The sash-balance is contained within a casing comprising the sheet-metal sides 5 and 6, formed integral with the face-plate 7. These sides 5 and 6 have the inwardly-curving upper and lower ends 8 8 and 9 9, furnished with the tongues 10 11, which overlap the respective edge portions of the respective sides 5 or 6. The inner portions of these curving ends 8 8 and 9 9 are offset inwardly to form the shoulders 12 12, (shown in Fig. 6 of the drawings,) and in the sides 5 and 6 are formed the slots 13 13 and 14 14 and the central openings 15 15, the material of the sides adjacent to the slots 14 14 being offset, as is disclosed in section in Fig. 4 of the drawings, to form lips, as 16. At the lower portions of the sides 5 and 6 are formed the slots 17 and 18, and to the inner portions of such sides above these slots 17 and 18 are fixed the springs 19 and 20, the free ends of which extend downward and toward each other. The face-plate 7 is furnished with the gear-opening 21 and with the screw-sockets 22 22, 23, and 24, open to permit the insertion of the screws or bolts. In the socket 23 is seated the head of the bolt 25, carrying the nut 26, which bears against the tongue 11 of the side end 8, but which may bear against either of said tongues 10 or 11.

Provision is made for locking the balance-gear against rotation in order that the window-sash may be held against movement in any desired position. The device illustrated in the drawings for accomplishing this purpose comprises a locking plate or pawl 29, constructed to swing into and out of engagement with the gear-teeth, said locking plate or pawl being itself provided with projections or teeth for engaging the spaces between the gear-teeth, as indicated at 32. This pawl is here shown as comprising a plate doubled upon itself to form a hollow bearing, as shown at 30, through which is passed the bolt 27. Provision is made for holding this locking-pawl 29 in a vertical position, so as to keep it in locking engagement with the gear-teeth. We use for this purpose a pair of opposing springs 19, which pressing against opposite sides of the pawl serve to keep it centered in its locking position. The pawl may be thrown sidewise, however, against the tension of either spring by means of a thrust-pin passing through apertures 17 or 18 in either side of the casing. The advantage of this centering device is that the thrust-pin may be inserted on either side of the balance with precisely the same results in its action.

It is obvious that when the sash is down so that its bottom edge is in close contact with the sill the rack-bar will determine the exact position of the gear-teeth. Sometimes in setting up the device in a window-casing it will be found that the locking device will not exactly register with the spaces between the gear-teeth when the sash is tight down upon the sill, the result being that the sash cannot be locked in that position. To obviate this difficulty, we have made provision for adjusting the locking device in a direction corresponding to the rotation of the gear, so that the locking device may be brought into proper relationship to exactly engage the gear-teeth when the sash is down. This is accomplished by adjusting the pawl 29 longitudinally of the bolt 27, which may be accomplished by means of a nut 28, which lies in a recess formed in the pawl or plate 29 and which is made to travel longitudinally of the bolt by turning the plate, thus carrying the pawl 29 with it, so that the pawl can be readily adjusted along the periphery of the gear until it is in proper position to lock the gear when the sash is tight down against the sill.

On the ends of the bolts 25 and 27 are engaged the slotted ends of the rear spring 33, and on these ends of the bolts are mounted the perforated sheet-metal fittings 34 and 35, having lips 36 36, which engage the offset portions 12 12 of the case sides 5 and 6 and are flush with the ends 8 and 9, such fittings being secured in place by the nuts 37 37 on said bolts to hold the parts or sides 5 and 6 together.

The gear-frame consists of a pair of plates 38, (shown in plan view in Fig. 8 of the drawings,) each having the main portion furnished with a central bearing for the shaft 39, the inwardly-extending arm 40 having the bent portion 41, the outwardly-bent lips 42 42 and 43 43, and the inwardly-bent members 44. When the parts of the device are assembled, the lips 42 42 are movably engaged in the slots 13 13 of the sides 5 and 6, while the bent lips 43 43 are movably engaged in the slots 14 14 and are held in place by their inturned portions working over the offset portions of said sides adjacent to said slots. The bent portions 41 of the arms 40 assume the positions shown in dotted lines in Fig. 2 of the drawings, and the members 44 lap by each other, the outer member bearing against the spring 33.

The shaft 39 has the enlarged portion 45, the ends of which bear against the plates 38 38, as shown in Fig. 7 of the drawings, this central portion of the shaft having the ledge or longitudinal tooth 46. Mounted on this shaft for rotation independent thereof is the balance-gear, this gear comprising a pair of cup-like gear-sections 47 and 48. Each gear section or cup is formed from a piece of sheet metal, whose edge is bent over to form a peripheral flange or band 47[a] and 48[a], having series of hollow gear-teeth 49 and 50 struck up radially, as shown in the drawings, so that the hollow teeth are integral with the band from which they are stamped and, indeed, form part of said band. This hollow ribbed construction of the sheet metal affords the highest degree of strength and lightness, while it can be produced at a very low cost of material and labor. Each section of the gear has a sleeve 51 52 journaled on the shaft 39, the teeth of the outer section 47 being adapted to travel in the rack 3, while the teeth of the section 48 fit within the teeth of the section 47 and one of the teeth of the section 48 having the inwardly-extending bend 53, adapted to engage one end of the spring 54, the other end of said spring being engaged with the ledge 46 of the shaft portion 45.

By the use of the two slots 17 and 18 the case is made reversible for use at either side of the window-frame, and in this frame is mounted the sleeve 55, carrying the push-button 56, the stem 57 of which enters one of said slots and bears against the gear-locking device.

With the balance thus constructed the gear-frame formed by the plates 38 38 may move inward against the action of the spring 33 by reason of any irregularity of the rack, but will at all times be held in close relation to the rack by the pressure of the spring 33 on the bent members 44.

When it is desired to slide the sash, pressure is applied to the button 56, thus through the stem 57 pushing the gear-locking device 29 to swing the same against the action of the spring 19 or 20 and to disengage the teeth 32 of this locking device from the teeth of the gear. The sash may now be moved up or down in its frame with or against the action of the spring 54, as is usual in structures of this nature.

In order to lock the sash against movement, the push-button is released from such pressure, and the spring 19 or 20 will press the gear-locking device 29 back into engagement with the teeth of the gear, and thus lock the gear from rotation, thus preventing the movement of the sash.

While the sheet-metal gear and other parts comprising the present invention are shown as forming part of a sash-balance structure, it will of course be understood that we do not limit ourselves to the use of any of the parts comprising our invention in a sash-balance structure, since some of these parts and combinations are obviously of general utility in mechanics and are adapted for service in many other relations than that in which they are herein shown and described and are equally within the scope of our invention when used for other purposes.

Having thus described our invention, we claim as new and desire to secure by Letters Patent—

1. A sash-balance, comprising a casing formed of sheet metal and having a face-plate and side plates having inwardly-turned ends furnished with overlapping lips, and fittings for engaging said inwardly-turned ends.

2. A sash-balance, comprising a gear formed of two sheet-metal sections having peripheral walls shaped as teeth, the toothed wall of one section fitting within the corresponding wall of the other section.

3. A gear for a sash-balance embracing in its construction a peripheral band of sheet metal, portions of which are struck up radially to form a series of hollow gear-teeth integral with said band, substantially as described.

4. A sheet-metal gear for a sash-balance embracing in its construction, a hollow cup-like member whose edge is turned up to form a peripheral flange having a series of hollow teeth integral with and forming part of said flange, substantially as described.

5. A sash-balance, comprising a shaft, a gear rotatable thereon, and consisting of two sheet-metal sections forming a gear-case, each of said sections having a peripheral wall furnished with hollow teeth, the teeth of one section fitting within the teeth of the other section, a spring located between said sections and connected with said shaft and with one of said sections.

6. A sash-balance, comprising a casing formed of sheet metal and having slotted sides, a gear-frame formed of plates having outwardly-turned lips movable in said slots, a gear rotatably mounted in said gear-frame, and a spring acting against said gear-frame to move the same into an operative position.

7. The combination with the case having the sides 5 and 6 and the face-plate 7, the sides having the slots 13 13 and 14 14, the plates 38 38 having the lips 42 42 and 43 43 movably engaged in said slots, and a gear rotatably mounted in said frame, of the bolt 27, the nut 28 engaged thereon, the gear-locking device 29 mounted on said bolt and having the teeth 32 adapted to engage with the teeth of the gear, the springs 19 and 20 secured to the sides 5 and 6, and means for swinging the gear-locking device out of engagement with the gear, as and for the purpose described.

8. A sash-balance device for windows embracing in its construction, a rack-bar, an intermeshing balance-gear, a pawl for locking said parts against movement, said pawl being adjustably mounted to permit it to be properly set for locking the sash in any predetermined position, substantially as described.

9. In a sash-balance, the combination of a balance-gear provided with teeth, an interlocking-pawl arranged to engage the teeth to hold said gear against rotation, and an adjusting-screw for varying the locking position of said pawl to cause it to properly register with the gear when the sash is in contact with the sill, substantially as described.

10. In a sash-balance the combination of the balance-gear, the locking-pawl pivotally mounted upon a screw-threaded bolt, said pawl being provided with an engagement with said screw-thread to cause it to travel longitudinally of the bolt for purposes of adjustment, substantially as described.

11. In a sash-balance the combination of a balance-gear, a pawl for locking said gear against rotation, an automatic centering device arranged to move the pawl into locking position from either side, substantially as described.

12. In a sash-balance the combination of the balance-gear, the locking-pawl, opposing springs for normally holding said locking-pawl in position to interlock with the gear and for returning said pawl from either side into locking engagement when the pawl is moved out of engagement, substantially as described.

HENRY E. RATHBUN.
WILLIAM H. LONERGAN.

Witnesses:
JOHN E. CANNING,
JAMES A. PIRCE.